United States Patent

Yamamoto

[11] Patent Number: 5,814,576
[45] Date of Patent: Sep. 29, 1998

[54] CATALYST FOR PURIFYING EXHAUST GAS AND METHOD OF PRODUCING SAME

[75] Inventor: Shinji Yamamoto, Yokosuka, Japan

[73] Assignee: Nissan Motor Co., Ltd., Yokohama, Japan

[21] Appl. No.: 755,375

[22] Filed: Nov. 25, 1996

[30] Foreign Application Priority Data

Nov. 27, 1995 [JP] Japan ................................ 7-307916

[51] Int. Cl.$^6$ .......................... B01J 23/00; B01J 23/40; B01J 8/02
[52] U.S. Cl. .......................... 502/303; 502/326; 502/327; 423/213.5
[58] Field of Search .................. 502/304, 303, 502/340, 349, 328, 327, 326; 423/213.5

[56] References Cited

U.S. PATENT DOCUMENTS

| | | | |
|---|---|---|---|
| 5,045,521 | 9/1991 | Lox et al. | 502/304 |
| 5,198,403 | 3/1993 | Brand et al. | 502/304 |
| 5,275,997 | 1/1994 | Ganguli et al. | 502/304 |
| 5,492,878 | 2/1996 | Fujii et al. | 502/304 |

FOREIGN PATENT DOCUMENTS

| | | |
|---|---|---|
| 4-284847 | 10/1982 | Japan . |
| 58-20307 | 4/1983 | Japan . |
| 62-282641 | 10/1987 | Japan . |
| 6-378 | 1/1994 | Japan . |
| 7-60118 | 3/1995 | Japan . |

*Primary Examiner*—Wayne Langel
*Assistant Examiner*—Tanaga Anne Boozer
*Attorney, Agent, or Firm*—Foley & Lardner

[57] ABSTRACT

A catalyst for purifying exhaust gas from an automotive internal combustion engine. The catalyst comprises a monolithic carrier which is coated with a catalyst component carrying layer which includes rhodium and a zirconium oxide. The zirconium oxide contains at least one element selected from the group consisting of magnesium, calcium, strontium, barium, yttrium and lanthanum. The zirconium oxide in the catalyst component carrying layer has a composition represented by a general formula of $[X]_a Zr_b O_c$ where X is at least one element selected from the group consisting of magnesium, calcium, strontium, barium, yttrium and lanthanum; and a, b and c indicate ratios in number of atoms, in which a is within a range of from 0.01 to 0.6 on the assumption of b being 1.0, and c is a number of oxygen atom which satisfies valence of respective elements.

10 Claims, 1 Drawing Sheet

CATALYST FOR PURIFYING EXHAUST GAS AND METHOD OF PRODUCING SAME

BACKGROUND OF THE INVENTION

1. Field of the Invention

This invention relates to improvements in a catalyst for purifying exhaust gas and a method of producing the catalyst, and more particularly to a catalyst which can effectively convert harmful components such as hydrocarbons (referred hereinafter to as "HC"), carbon monoxide (referred hereinafter to as "CO") and nitrogen oxides (referred hereafter to as "NOx") of exhaust gas emitted from an internal combustion engine of an automotive vehicle to noxious gases and is high in low temperature activity and exhaust gas purifying performance even after an endurance or long time use of the catalyst.

2. Description of the Prior Art

Hitherto a variety of catalysts for purifying automotive exhaust gas have been proposed and put into practical use. However, such conventional catalysts are not sufficient in durability under high temperature conditions and therefore they are gradually deteriorated thereby lowering an exhaust gas purifying performance. Accordingly, development of catalysts high in low temperature activity and exhaust gas purifying performance have been eagerly desired. Efforts to develop such high performance catalysts have been extensively made.

Such catalysts are, for example, disclosed in Japanese Patent Publication No. 58-20307, Japanese Patent Provisional Publication No. 62-282641, Japanese Patent Provisional Publication No. 4-284847, Japanese Patent Provisional Publication No. 6-378 and Japanese Patent Provisional Publication No. 7-60118.

The catalyst disclosed in Japanese Patent Publication No. 58-20307 includes a composition containing platinum, rhodium and cerium, carried on a refractory carrier. More particularly, the elements of the platinum group such as platinum, platinum, rhodium and the like are carried on alumina and/or cerium oxide. The such alumina and/or cerium oxide carrying the elements of the platinum group are coated on a monolithic carrier.

The catalyst disclosed in Japanese Patent Provisional Publication No. 62-282641 includes rhodium carried on zirconium oxide. More specifically, a slurry is first prepared by mixing zirconium oxide, activated alumina, cerium oxide and alumina sol. The slurry is then coated on a carrier. After the slurry is dried and fired, platinum is carried on the carrier.

The catalyst disclosed in Japanese Patent Provisional Publication No. 4-284847 includes a combination of cerium oxide and zirconium compound which is stabilized with at least one element selected from the group consisting of lanthanum, praseodymium, yttrium, neodymium, elements of the IIa group and IIIb group of the periodic table, in addition to conventional catalyst components such as platinum, rhodium, activated alumina, cerium oxide and the like.

The catalyst disclosed in Japanese Patent Provisional Publication No. 6-378 includes activated alumina and cesium oxide which carry, as catalyst components, at least one of platinum and palladium, and at least one element selected from the group consisting of potassium, cesium, strontium and barium as basic elements. In other words, in this catalyst, at least one compound of potassium, cesium, strontium and barium is combined with conventional catalyst components such as the platinum group elements, activated alumina, cerium oxide and the like.

The catalyst disclosed in Japanese Patent Provisional Publication No. 7-60118 is a noble metal catalyst including a carrier formed of zirconium oxide stabilized with yttria, calcia, magnesia or scandia, and 40 to 95 wt % of alumina or titania. The carrier is an oxygen ion conductive composite having a surface area of 30 to 300 $m^2/g$, and carries thereon rhodium/platinum or rhodium/palladium.

However, the above-discussed conventional catalysts disclosed in the publications employ a large amount of noble metal(s) in order to maintain a high exhaust gas purifying performance during a long period of time from the initial time to a time upon an endurance use. In view of this, it is eagerly desired to obtain a catalyst (particularly a so-called three-way catalyst for oxidizing HC and CO and reducing NOx) for exhaust gas purification which catalyst is high in exhaust gas purifying performance even with a small amount of noble metal(s). However, in case of reducing the amount of noble metal(s), the durability of the catalyst at high temperatures becomes insufficient and therefore the catalyst activity and the exhaust gas purifying performance after a high temperature endurance or long time use are degraded.

The reasons for this is assumed as follows: Deterioration (sintering) of noble metal(s) is accelerated in an automotive exhaust gas atmosphere in which air-fuel(combustibles) ratio changes widely from a rich one (reduction atmosphere) to a lean one (oxidation atmosphere) relative to a stoichiometric air-fuel ratio, thereby lowering the exhaust gas purifying performance of the catalyst. Particularly in case that the amount of noble metal(s) is reduced, lowering in exhaust gas purifying performance is predominant.

Additionally, the following mechanism is assumed: Alumina is insufficient in thermal stability and therefore is changed in crystal structure at high temperatures thus causing a phase transition to α-alumina having a remarkably small BED specific surface area. At this time, sintering of noble metal(s) is promoted, and alumina and noble metal(s) make a solid phase reaction to form an inactive compound thereby largely lowering the exhaust gas purifying performance. Zirconium oxide is high in structural stability but small in BED specific surface area, and therefore the dispersion characteristics of noble metal(s) is degraded so that it becomes difficult to obtain sufficient low temperature activity and exhaust gas purifying performance throughout the initial time to the time upon the endurance or long time use.

SUMMARY OF THE INVENTION

It is an object of the present invention to provide an improved catalyst for purifying exhaust gas and a method of producing the same catalyst, which can effectively overcome drawbacks encountered in conventional exhaust gas purifying catalysts.

Another object of the present invention is to provide an improved catalyst for purifying exhaust gas and a method of producing the same catalyst, which catalyst is high in durability and is high in low temperature activity and exhaust gas purifying performance even upon a high temperature endurance or long time use.

The inventor has made a variety of research and development works in order to improve the high temperature durability and catalyst activity of rhodium, and have found the fact that the low temperature activity and exhaust gas purifying performance after a high temperature endurance or long time use can be greatly improved by causing a zirconium oxide containing element(s) of the group IIa and the group IIIb of the periodic table (preferably in a certain component ratio) to be contained together with rhodium in a catalyst component carrying layer of a catalyst.

A first aspect of the present invention resides in a catalyst for purifying exhaust gas, which comprises a monolithic carrier, and a catalyst component carrying layer formed on a surface of the monolithic carrier. The catalyst carrier component carrying layer includes rhodium and a zirconium oxide. The zirconium oxide contains at least one element selected from the group consisting of magnesium, calcium, strontium, barium, yttrium and lanthanum.

With the above aspect, the exhaust gas purifying catalyst is excellent in durability under high temperature conditions, and sufficiently high in low temperature catalytic activity and exhaust gas purifying performance even after an endurance or long time use. The catalyst is particularly high in conversion (%) of HC, NO and NOx in exhaust gas emitted from an automotive internal combustion engine.

A second aspect of the present invention resides in a method of producing a catalyst for purifying exhaust gas, which comprises the following steps: (a) adding a water soluble salt of zirconium and a water soluble salt of at least one element selected from the group consisting of magnesium, calcium, strontium, barium, yttrium and lanthanum into water to form a liquid containing at least one catalyst component; (b) adding an aqueous solution containing at least one of ammonia and ammonium compound to the liquid so as to adjust pH of the liquid within a range of from 6.0 to 10.0 thereby obtaining precipitate; (c) drying the precipitate; and (d) firing the dried precipitate thereby forming a zirconium oxide containing at least one element selected from the group consisting of magnesium, calcium, strontium, barium, yttrium and lanthanum; (e) impregnating the zirconium oxide with rhodium; (f) providing a monolithic carrier; and (g) coating the zirconium oxide containing rhodium on a surface of the monolithic carrier.

A third aspect of the present invention resides in a method of producing a catalyst for purifying exhaust gas, which comprises the following steps: (a) preparing a suspension liquid containing zirconium oxide; (b) adding a water soluble salt of at least one element selected from the group consisting of magnesium, calcium, strontium, barium, yttrium and lanthanum into water to form a liquid containing at least one catalyst component; (c) gradually dropping the catalyst component containing liquid to the suspension liquid to form a mixed liquid; (d) adjusting pH of the mixed liquid at a level ranging from 6.0 to 10.0 to form precipitate; (e) drying the precipitate; and (f) firing the dried precipitate thereby forming a zirconium oxide containing at least one element selected from the group consisting of magnesium, calcium, strontium, barium, yttrium and lanthanum; (g) impregnating the zirconium oxide with rhodium; (h) providing a monolithic carrier; and (i) coating the zirconium oxide containing rhodium on a surface of the monolithic carrier.

A fourth aspect of the present invention resides in a method of producing a zirconium oxide forming part of a catalyst for purifying exhaust gas, comprising the following steps: (a) adding a water soluble salt of zirconium and a water soluble salt of at least one element selected from the group consisting of magnesium, calcium, strontium, barium, yttrium and lanthanum into water to form a liquid containing at least one catalyst component; (b) adding an aqueous solution containing at least one of ammonia and ammonium compound to the liquid so as to adjust pH of the liquid within a range of from 6.0 to 10.0 thereby obtaining precipitate; (c) drying the precipitate; and (d) firing the dried precipitate thereby obtaining the zirconium oxide containing at least one element selected from the group consisting of magnesium, calcium, strontium, barium, yttrium and lanthanum.

A fifth aspect of the present invention resides in a method of producing a zirconium oxide forming part of a catalyst for purifying exhaust gas, comprising the following steps: (a) preparing a suspension liquid containing zirconium oxide; (b) adding a water soluble salt of at least one element selected from the group consisting of magnesium, calcium, strontium, barium, yttrium and lanthanum into water to form a liquid containing at least one catalyst component; (c) gradually dropping the catalyst component containing liquid to the suspension liquid to form a mixed liquid; (d) adjusting pH of the mixed liquid at a level ranging from 6.0 to 10.0 to form precipitate; (e) drying the precipitate; and (f) firing the dried precipitate thereby obtaining zirconium oxide containing at least one element selected from the group consisting of magnesium, calcium, strontium, barium, yttrium and lanthanum.

A sixth aspect of the present invention resides in a catalyst for purifying exhaust gas, which comprises a monolithic carrier, and a catalyst component carrying layer formed on a surface of the monolithic carrier. The catalyst carrier component carrying layer includes rhodium and a zirconium oxide. The zirconium oxide contains at least one element selected from the group consisting of magnesium, calcium, strontium, barium, yttrium and lanthanum. The zirconium oxide is produced by a process including the following steps: (a) adding a water soluble salt of zirconium and a water soluble salt of at least one element selected from the group consisting of magnesium, calcium, strontium, barium, yttrium and lanthanum into water to form a liquid containing at least one catalyst component; (b) adding an aqueous solution containing at least one of aqueous ammonia and ammonium compound to the liquid so as to adjust pH of the liquid within a range of from 6.0 to 10.0 thereby obtaining precipitate; (c) drying the precipitate; and (d) firing the dried precipitate thereby obtaining the zirconium oxide containing at least one element selected from the group consisting of magnesium, calcium, strontium, barium, yttrium and lanthanum.

A seventh aspect of the present invention resides in a catalyst for purifying exhaust gas, which comprises a monolithic carrier, and a catalyst component carrying layer formed on a surface of the monolithic carrier. The catalyst carrier component carrying layer includes rhodium and a zirconium oxide. The zirconium oxide contains at least one element selected from the group consisting of magnesium, calcium, strontium, barium, yttrium and lanthanum. The zirconium oxide is produced by a process including the following steps: (a) preparing a suspension liquid containing zirconium oxide; (b) adding a water soluble salt of at least one element selected from the group consisting of magnesium, calcium, strontium, barium, yttrium and lanthanum into water to form a liquid containing at least one catalyst component; (c) gradually dropping the catalyst component containing liquid to the suspension liquid to form a mixed liquid; (d) adjusting pH of the mixed liquid at a level ranging from 6.0 to 10.0 to form precipitate; (e) drying the precipitate; and (f) firing the dried precipitate thereby obtaining zirconium oxide containing at least one element selected from the group consisting of magnesium, calcium, strontium, barium, yttrium and lanthanum.

DETAILED DESCRIPTION OF THE INVENTION

Figure 1:
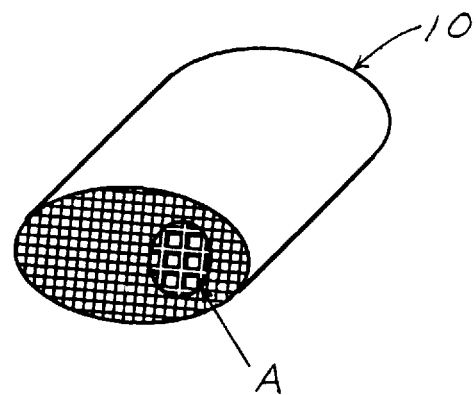
FIG. 1 is a perspective view of an embodiment of a catalyst according to the present invention, in which a part surrounded by a circle A is shown enlarged.
Figure 2:
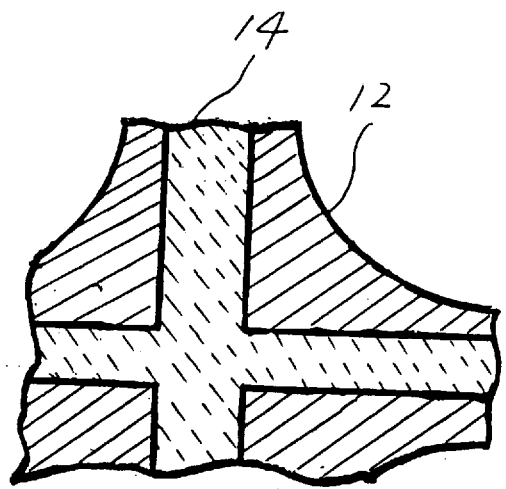
FIG. 2 is an enlarged fragmentary sectional view of a portion of the part (surrounded by the circle A) of the catalyst of FIG. 1.

According to the present invention, as shown in FIG. 1, a catalyst 10 for purifying exhaust gas comprises a monolithic carrier 14. A catalyst component carrying layer 12 is formed on a surface of the monolithic carrier 14. The catalyst carrier component carrying layer 12 includes rhodium and a zirconium oxide. The zirconium oxide contains at least one selected from the group consisting of magnesium, calcium, strontium, barium, yttrium and lanthanum.

The exhaust gas purifying catalyst of the present invention has at least rhodium as a noble metal contained in the catalyst component carrying layer thereof. The content of rhodium is preferably 0.01 to 3.00 g per liter of the exhaust gas purifying catalyst. If the content is less than 0.01 g, the catalyst cannot sufficiently exhibit a catalyst activity at low temperatures and an exhaust gas purifying performance. Even if the content exceeds 3.00 g, the catalytic activity of rhodium is saturated while providing an economical ineffectiveness.

In this invention, rhodium is carried on zirconium oxide as a substrate which functions to improve a dispersion characteristics and a high temperature durability of rhodium. In order to improve a low temperature catalytic activity and an exhaust gas purifying performance of the catalyst, the above zirconium oxide contains at least one element selected from the group consisting of magnesium, calcium, strontium, barium, yttrium and lanthanum. The amount of the zirconium oxide is 5 to 100 g per 1 liter of the catalyst. If the amount is less than 5 g, a sufficient dispersion characteristics of the noble metal cannot be obtained. Even if the amount exceeds 100 g, the improvement effects are saturated thereby providing an economical ineffectiveness. It is to be noted that sintering of rhodium at high temperatures can be suppressed by causing rhodium to be carried on the zirconium oxide containing at least one element selected from the group consisting of magnesium, calcium, strontium, barium, yttrium and lanthanum.

The zirconium oxide in the catalyst component carrying layer has a composition represented by the following general formula:

$$[X]_a Zr_b O_c$$

where X is at least one element selected from the group consisting of magnesium, calcium, strontium, barium, yttrium and lanthanum; and a, b and c indicates ratios in number of atoms, in which a is within a range of from 0.01 to 0.6 on the assumption of b being 1.0, and c is a number of oxygen atom which satisfies the valence of the respective elements. In case that a is less than 0.01, effects of element (s) of the group IIa and/or the group IIIb of the periodic table of the elements are low and therefore cannot offer sufficient improvements on the low temperature catalytic activity and the exhaust gas purifying performance so that the effects are generally same as those of zirconia ($ZrO_2$). The above element(s) of the group IIIb and/or the group IIa is at least one element selected from the group consisting of magnesium, calcium, strontium, barium, yttrium and lanthanum, added to the zirconium oxide. In case that a exceeds 0.6, it is difficult that the element(s) added to the zirconium oxide forms a composite oxide as a solid solution, together with zirconium oxide, and therefore the physical properties of the zirconium oxide (such as thermal stability and a so-called BET specific surface area and the like) are lowered. This lowers a dispersion characteristics of rhodium thereby rendering it difficult to obtain a sufficient performance of the catalyst at an initial period of an endurance or long time use, promoting sintering of rhodium during the durable use, and deteriorating the catalytic performance after the durable use at high temperatures.

According to the present invention, the zirconium oxide has the specific composition (the ratio in number of atoms) represented by the above general formula of $[X]_a Zr_b O_c$. As a result, the added elements are completely combined in the crystal structure of the zirconium oxide to form a solid solution, and therefore no oxide of the added elements exists on the surface of the zirconium oxide so that no inactive compound of rhodium and the oxide of the added element(s) is formed. Additionally, the zirconium oxide is improved in structural stability at high temperatures while being increased in specific surface area.

Preferably, the zirconium oxide contains at least one element selected from the group consisting of cerium, neodymium and lanthanum, in an amount ranging from 1 to 40 mol % (upon being converted into metal), in which zirconium is in an amount ranging from 60 to 98 mol % (upon being converted into metal). This addition of at least one element selected from the group consisting of cerium, neodymium and lanthanum is to improve an oxygen releasing ability, the BET specific surface area and the thermal stability of zirconium oxide ($ZrO_2$). If the added amount or content of the element(s) is less than 1 mol %, the effects are the same as those of $ZrO_2$ thereby exhibiting no improvement in effects. Even if the added amount or content is over 40 mol %, the improvement effects are saturated or lowered conversely.

The above-mentioned at least one element selected from the group consisting of cerium, neodymium and lanthanum is contained in zirconium oxide powder which is contained in the catalytic component carrying layer. By virtue of this, the zirconium oxide high in oxygen absorbing ability releases lattice oxygen and absorbed oxygen under a rich atmosphere (low in oxygen content relative stoichiometric atmosphere) and under an atmosphere having an air-fuel (combustibles) ratio near stoichiometric one, so that the oxidation condition of rhodium is rendered suitable for purification of exhaust gas thereby suppressing a lowering in catalytic performance of rhodium.

Preferably, the catalyst component carrying layer contains at least one element selected from the group consisting of platinum and palladium. The content of the at least one element is within a range of from 0.1 to 15 g per 1 liter of the catalyst. If the content is less than 0.1 g, the catalyst cannot sufficiently exhibit the low temperature catalytic activity and the exhaust gas purifying performance. If the content exceeds 15 g, the catalytic activity of platinum and palladium is saturated thereby providing an economical ineffectiveness.

Alumina is suitable for a sustrate for carrying platinum and/or palladium because alumina improves the dispersion characteristics and the catalytic performance of platinum and palladium. Additionally, at least one element selected from the group consisting of cerium, zirconium and lanthanum is contained in the catalytic component carrying layer containing alumina in order to improve a structural stability of alumina after the long time or endurance use of the catalyst and suppress a phase transition of alumina to α-alumina and a lowering in the BET specific surface area. The content of the at least one element selected from the group consisting of cerium, zirconium and lanthanum is within a range of from 1 to 10 mol % (upon being converted into metal) of the alumina. If the content of the at least one element is less than 1 mol %, the dispersion characteristics of the at least one element is inferior so as to cause the phase transition to α-alumina thereby lowering the specific surface area of the alumina thus degrading the exhaust gas purifying performance of the catalyst. If the content exceeds 10 mol %, the amount of cerium, zirconium and/or lanthanum is too large, and therefore oxide thereof is produced thereby lowering the specific surface area of the alumina thus degrading the exhaust gas purifying performance of the catalyst. The amount of the alumina to be used is within a range of from 10 to 200 g per 1 liter of the catalyst. If the used amount is less than 10 g, a sufficient dispersion characteristics of the noble metal(s) cannot be obtained. Even if the used amount exceeds 200 g, the catalytic performance of the catalyst is saturated providing no predominant improvement effects in the catalytic performance.

By virtue of the fact that the catalyst component carrying layer contains at least one of platinum and palladium, improvements can be accomplished in the low temperature catalytic activity, the exhaust gas purifying performance and poisoning resistance of the catalyst after the high temperature long time or endurance use under the effects of rhodium and the synergistic effects of platinum and palladium.

Preferably, the above catalyst component carrying layer of the catalyst further contains cerium oxide which contains at least one element selected from the group consisting of zirconium, neodymium and lanthanum in a content ranging from 1 to 40 mol % (upon being converted into metal), in which the content of cerium is within a range of from 60 to 98 mol %. With the above content of zirconium, neodymium and/or lanthanum, cerium oxide ($CeO_2$) is improved in oxygen releasing ability, BET specific surface area and thermal stability. In this connection, if the content is less than 1 mol %, the improvement effects are the same as those of $CeO_2$ while exhibiting no effects based on addition of zirconium, neodymium and lanthanum. Even if the content exceeds 40 mol %, the improvement effects are saturated or lowered conversely.

It is also preferable that the catalyst component carrying layer contains at least one element selected from the group consisting of zirconium, neodymium and lanthanum in a content ranging from 1 to 40 mol % (upon being converted into metal), and a cerium oxide having a cerium content ranging from 60 to 98 mol % (upon being converted into metal). With this catalyst component carrying layer, the lattice oxygen and the absorbed oxygen are released in the rich atmosphere and in the atmosphere having an air-fuel ratio near the stoichiometric level, from the cerium oxide which is high in oxygen absorbing ability. This puts platinum and palladium into oxidized conditions suitable for purifying exhaust gas thereby suppressing a lowering in catalytic ability of the catalyst.

Further it is preferable that the catalyst component carrying layer contains at least one element selected from the group consisting of elements of alkali metals and alkaline earth metals. The alkali metals and the alkaline earth metals include lithium, sodium, potassium, cesium, magnesium, calcium, strontium and barium. The content of the at least one of the alkali metals and the alkaline earth metals is within a range of from 1 to 40 g per 1 liter of the catalyst. If the content is less than 1 g, it is impossible to suppress poisoning due to absorption of hydrocarbons and sintering of palladium. If the content exceeds 40 g, remarkable effects due to an increased content of the alkali metal(s) and alkaline earth metal(s) cannot be obtained while lowering the exhaust gas purifying performance of the catalyst conversely.

Thus, addition of the at least one element selected from the group consisting of elememts of alkali metals and alkaline earth metals to the catalyst component carrying layer softens the poisoning due to adsorption of hydrocarbons under the rich atmosphere and suppresses sintering of palladium thereby further improving the catalytic activity and the activity at low temperatures in the reduction atmosphere, thus improving the exhaust gas purifying performance.

Next, production of the catalyst according to the present invention will be discussed hereinafter.

First, the zirconium oxide is prepared as follow: A water soluble salt of zirconium and a water soluble salt of each of at least one element selected from the group consisting of magnesium, calcium, strontium, barium, yttrium and lanthanum are dissolved or dispersed in water to form an aqueous solution or an aqueous dispersion. Then, an ammonia aqueous solution or an aqueous solution of an ammonium compound is added to the solution or the dispersion so as to adjust pH of the solution or the dispersion within a range of from 6.0 to 10.0 to obtain precipitate. The precipitate is dried after removal of water, and then is fired.

More specifically, a catalyst material containing the above-mentioned at least one element (catalyst component) selected from the group consisting of magnesium, calcium, strontium, barium, yttrium and lanthanum and zirconium is added to pure water and stirred to form a solution or mixture liquid. In this process, the catalyst material containing the above-mentioned at least one element and another catalyst material containing zirconium may be separately dissolved respectively in a liquid and another liquid which are to be added to each other.

Subsequently, ammonia aqueous solution or ammonium compound aqueous solution is gradually added to the solution or liquid containing the catalyst components thereby adjusting pH of the solution or liquid within a range of from 6.0 to 10.0. Thereafter, the water content is removed, and then residue or precipitate is subjected to a heat treatment thereby obtaining the zirconium oxide. The zirconium oxide is then impregnated with rhodium so that the zirconium oxide carries rhodium. The zirconium carrying rhodium is subjected to a heat treatment.

Otherwise, the zirconium oxide may be prepared as follows: A water soluble salt of at least one element (catalyst component) selected from the group consisting of magnesium, calcium, strontium, barium, yttrium and lanthanum is dissolved or dispersed in water to form a solution or a liquid containing the catalyst component. The solution or liquid is gradually dropped in a suspension which has been already prepared and containing precipitate of zirconium oxide. Thereafter, the pH of the suspension (or solution) containing the catalyst component is adjusted within a range of from 6.0 to 10.0 to form precipitate. Then, the water content is removed from the precipitate, and thereafter the precipitate is fired to obtain the zirconium oxide of the present invention.

The zirconium oxide of the present invention may be produced under a variety of combination of nitrate, carbonate, acetate, oxide and the like of at least one element selected from the group consisting of magnesium, calcium, strontium, barium, yttrium and lanthanum, and zirconium which are to be contained in the zirconium oxide.

Preparation of the above zirconium oxide is not limited to special processes and therefore is accomplished by suitably selecting one of known precipitation process, impregnation process, evaporation process to dryness, and the like as far as no remarkable localization of the catalyst components occur. It will be understood that the precipitation process is preferable to obtain the zirconium oxide having uniform composition and crystal structure and a sufficient surface area, in which the salt of each of the above-mentioned elements is dissolved or dispersed in water to form the solution or dispersion liquid, and thereafter the ammonia aqueous solution or the ammonium compound aqueous solution is added as a precipitant to the solution or liquid.

In the above precipitation process, precipitate of metal salt of the above-mentioned elements is formed by adjusting the pH of the solution or liquid within a range of from 6.0 to 10.0. If the pH is lower than 6.0, precipitate of the metal salt of the element(s) cannot be sufficiently formed. If the pH is higher than 10.0, it is possible that a part of precipitate formed redissolves in the solution or liquid.

Removal of water content of the precipitate is accomplished by suitably selecting one of, for example, known filtering process, evaporation process to dryness and the like. The first heat treatment to obtain the zirconium oxide of the present invention is not limited to a particular one, in which it is preferable to fire the dried precipitate at a relatively low temperature ranging from 400° to 800° C. in air and/or under air stream in order to obtain a large surface area thereof for the purpose of carrying rhodium in a well dispersed state.

Addition of rhodium to the above-mentioned zirconium oxide is accomplished by one selected from known impregnation process, kneading or mixing process and the like. It is preferable to use the impregnation process in which the zirconium oxide is impregnated with rhodium. A compound of rhodium to be impregnated is suitably selected from chloride, nitrate and the like which are soluble in water.

In the exhaust gas purifying catalyst according to the present invention, the zirconium oxide particularly obtained under the precipitation process are provided with a fine pore structure, a large BET specific surface area and a uniform crystal structure. These play an important role in the catalyst exhibiting the catalytic activity of rhodium at low temperatures. In contrast, in the zirconium oxide obtained under other processes than the precipitation process, the specific surface area effective for catalytic reaction is small, while the added elements cannot be formed as a composite oxide which is a solid solution combined with the zirconium oxide so as to be localized at the surface portion of the catalyst. This lowers the catalytic activity of rhodium and the exhaust gas purifying performance of the catalyst.

It is also preferable that zirconium oxide powder containing at least one element selected from the group consisting of cerium, neodymium and lanthanum is added to powder of the zirconium oxide carrying rhodium. This further effectively maintains the oxidation state of rhodium under a reduction or rich atmosphere, in a condition to be suitable for exhaust gas purification. It is more preferable that the zirconium oxide carrying rhodium is supplied with alumina power and/or cerium oxide powder which carries platinum and/or palladium by using the impregnation process. A raw material of platinum or palladium is selected from diammine dinitrate, chloride, nitrate and the like which are soluble in water.

Preferably, cerium oxide powder containing at least one selected from the group consisting of zirconium, neodymium and lanthanum is added to the alumina powder and/or cerium oxide powder which carries platinum and/or palladium under the impregnation process. This further effectively maintains the oxidation state of platinum and/or palladium under the reduction atmosphere, in a condition to be suitable for exhaust gas purification.

The above-mentioned zirconium oxide may be effectively used as a catalyst without being carried on a catalyst carrier or support. However, it is preferable that the zirconium oxide is coated as a slurry formed by being pulverized, on a catalyst carrier or support, followed by being subjected to firing at 400° to 900° C. More specifically, alumina sol is added to a mixture of the zirconium oxide carrying the noble metal(s), the zirconium oxide powder, the alumina oxide powder carrying the noble metal(s) and the cerium oxide carrying the noble metal to form a slurry upon being pulverized under a wet state. The slurry is coated on the carrier and then is fired preferably at a temperature ranging from 400° to 650° C. in air and/or under air stream.

The catalyst carrier or support is selected from known ones such as a monolithic carrier made of a refractory, and a metallic carrier. The shape of the catalyst carrier is not particularly limited to one, in which it is usually preferable that the carrier has a honeycomb shape. The honeycomb-shaped carrier is coated with the catalyst component carrying layer containing the catalyst elements. Usually, there is a tendency that the honeycomb-shaped carrier is made of a ceramic such as cordierite. Otherwise, the honeycomb-shaped carrier may be formed of a metallic material such as ferritic stainless steel. Additionally, it will be understood that the powder containing the catalyst component(s) may be formed into the honeycomb shape to obtain a honeycomb-shaped catalyst, in which the contacting surface area of the catalyst with exhaust gas is increased while suppressing a pressure drop due to the catalyst. Therefore, this catalyst is very effective for purification of automotive exhaust gas.

The amount of a coat layer (or the catalyst component carrying layer) to be formed on the honeycomb-shaped carrier is preferably within a range of from 50 to 400 g per 1 liter of the catalyst. In this regard, it may be preferable to increase the amount of the coat layer from the view point of catalytic activity and catalytic life; however, an insufficient diffusion of reaction gas occurs within the catalyst component carrying layer thereby causing an insufficient contact of the reaction gas with the catalyst component in case that the thickness of the catalyst component carrying layer is too large. This will saturate a catalytic activity increasing effect and increase a passing resistance of gas flowing through the catalyst. As a result, it is preferable that the amount of the coat layer or catalyst component carrying layer is within the range of from 50 to 400 g per 1 liter of the catalyst.

Furthermore, in order to cause the synergistic effects of rhodium and platinum and/or palladium to be exhibited, it is preferable that the catalyst component carrying layer (coat layer) includes an inside (lower) layer in contact with the carrier, and an outside (upper) layer, in which the inside layer contains platinum and/or palladium while the outside layer contains rhodium. It is also preferable that platinum is contained in the outside layer containing rhodium.

More preferably, the catalyst component carrying layer of the catalyst of the present invention further contains at least one element of alkali metals and/or alkaline earth metals. The alkali metals and alkaline earth metals usable as the catalyst component(s) include at least one of lithium, sodium, potassium, cesium, magnesium, calcium, strontium and barium. Compounds of the alkali metals and alkaline earth metals usable as the catalyst materials are in the form of oxide, acetate, hydroxide and the like which are soluble in water. With this, the element(s) of alkali metals and/or alkaline earth metals can be carried in close proximity to palladium in a highly dispersed condition. More specifically, the carrier coated with a wash coat component is impregnated with an aqueous solution of powder of alkali metal compounds and/or alkaline earth metal compounds. Then, the impregnated carrier is dried and fired at a relatively low temperature ranging from 200° to 600° C. in air and/or under air stream. If the firing temperature is lower than 200° C., the alkali metals and/or the alkaline earth metals cannot be sufficiently converted to the form of oxide. Even if the firing temperature exceeds 600° C., the effects due to the increased firing temperature is saturated thereby providing no predominant improved effects.

In order to evaluate the exhaust gas purifying catalyst according to the present invention, Examples of the present invention will be discussed hereinafter in comparison with Comparative Examples which are out of the scope of the present invention.

EXAMPLE 1

An alumina powder ("Powder A") containing 3 mol % of cerium (8.7 wt % upon being converted into $CeO_2$), 3 mol % of zirconium (6.3 wt % upon being converted into $ZrO_2$) and 2 mol % of lanthanum (5.5 wt % upon being converted into $La_2O_3$) was impregnated with a palladium nitrate aqueous solution, and then fired at 400° C. for 1 hour in air upon being dried at 150° C. for 12 hours thereby to form alumina powder carrying Pd ("Powder B"). The Pd content of this Powder B was 1.7 wt %.

A cerium oxide powder ("Powder C") containing 1 mol % of lanthanum (2 wt % upon being converted into $La_2O_3$) and 32 mol % of zirconium (25 wt % upon being converted into $ZrO_2$) was impregnated with a palladium nitrate aqueous solution, and fired at 400° C. for 1 hour in air upon being dried at 150° C. for 12 hours thereby to form a cerium oxide ($La_{0.01}Zr_{0.32}Ce_{0.67}O_x$) powder ("Powder D"). The Pd content of this Powder D was 0.75 wt %.

The above-mentioned Powder A in an amount of 54 g, Powder B in an amount of 426 g, Powder C in an amount of 30 g, Powder D in an amount of 290 g, and nitric acid aqueous solution in an amount of 1000 g were supplied into a porcelain ball mill, and mixed and pulverized to form a slurry. This slurry was coated on the surface of a monolithic carrier formed of cordierite and having a volume of 1.7 liter and 400 cells. An excessive amount of the slurry was removed from the monolithic carrier under the influence of air stream, and then the slurry was dried. Thereafter, the monolithic carrier coated with the slurry was fired at 400° C. for 1 hour thereby completing a coating operation for the slurry. This slurry coating operation was again carried out thereby to obtain a catalyst ("Catalyst A") having a coat layer (or the catalyst component carrying layer) having a weight of 200 g per 1 liter of the monolithic carrier. The content or carried amount of Pd of the Catalyst A was 66.7 g/cf (2.4 g/liter).

A $Ca_{0.2}Zr_{1.0}O_x$ podwer ("Powder E") was impregnated with a rhodium nitrate aqueous solution, and fired at 400° C. for 1 hour upon being dried at 150° C. for 12 hours thereby form a $Ca_{0.2}Zr_{1.0}O_x$ powder carrying Rh ("Powder F"). The Rh content of this Powder F was 1.06 wt %.

The Powder A was impregnated with a diammine dinitro platinum aqueous solution, and then was fired at 400° C. for 1 hour in air upon being dried at 150° C. for 12 hours thereby to form an alumina powder ("Powder G") carrying Pt. The Pt content of this Powder G was 1.1 wt %.

A zirconium oxide powder ("Powder H") containing 223 g of the Powder F, 214 g of the Powder G, 1 mol % of lanthanum (1.2 wt % upon being converted into $La_2O_3$) and 20 mol % of cerium (25.8 wt % upon being converted into $CeO_2$) was supplied in an amount of 213 g together with 1000 g of a nitric acid aqueous solution into a porcelain ball mill, and mixed and pulverized thereby to form a slurry. This slurry was coated on the above Catalyst A, and then an excessive slurry was removed from the Catalyst A under the influence of air stream. Thereafter, the coated Catalyst A was dried and fired at 400° C. for 1 hour thereby obtaining a catalyst ("Catalyst B") having a coat layer having a weight of 65 g per 1 liter of the carrier. The carried amount of Rh was 6.7 g/cf (0.24 g/liter). The carried amount of Pt was 6.7 g/cf (0.24 g/liter).

Subsequently, the above Catalyst B was coated with a barium acetate solution and then fired at 400° C. for 1 hour so as to be impregnated with 20 g/liter of BaO. Thus, an exhaust gas purifying catalyst of Example 1 was obtained.

EXAMPLE 2

The procedure made in Example 1 was repeated with the exception that $Mg_{0.09}Zr_{1.0}O_x$ was used in place of $Ca_{0.2}Zr_{1.0}O_x$, thereby obtaining an exhaust gas purifying catalyst of Example 2.

EXAMPLE 3

The procedure made in Example 1 was repeated with the exception that $Sr_{0.1}Zr_{1.0}O_x$ was used in place of $Ca_{0.2}Zr_{1.0}O_x$, thereby obtaining an exhaust gas purifying catalyst of Example 3.

EXAMPLE 4

The procedure made in Example 1 was repeated with the exception that $Y_{0.1}Zr_{1.0}O_x$ was used in place of $Ca_{0.2}Zr_{1.0}O_x$, thereby obtaining an exhaust gas purifying catalyst of Example 4.

EXAMPLE 5

The procedure made in Example 1 was repeated with the exception that $La_{0.3}Zr_{1.0}O_x$ was used in place of $Ca_{0.2}Zr_{1.0}O_x$, thereby obtaining an exhaust gas purifying catalyst of Example 5.

EXAMPLE 6

The procedure made in Example 1 was repeated with the exception that $Nd_{0.4}Zr_{1.0}O_x$ was used in place of $Ca_{0.2}Zr_{1.0}O_x$, thereby obtaining an exhaust gas purifying catalyst of Example 6.

EXAMPLE 7

An alumina powder ("Powder I") containing 3 wt % of zirconium was impregnated with a rhodium nitrate aqueous solution, and then was fired at 400° C. for 1 hour upon being dried at 150° C. for 12 hours thereby forming an alumina powder carrying Rh ("Powder J"). The Rh content of this Powder J was 2.25 wt %.

An alumina powder ("Powder K") containing 3 mol % of cerium was impregnated with a diammine dinitro platinum aqueous solution, and was fired at 400° C. for 1 hour upon being dried at 150° C. for 12 hours thereby forming an alumina powder carrying Pt ("Powder L"). The Pt content of this Powder L was 2.48 wt %.

The Powder J in an amount of 105 g, 95 g of the Powder L, 200 g of the Powder H prepared in Example 1, 200 g of the Powder E ($Ca_{0.2}Zr_{1.0}O_x$) were supplied together with 1000 g of a nitric acid aqueous solution into a porcelain ball mill, and mixed and pulverized thereby to obtain a slurry. This slurry was coated on the Catalyst A obtained in Example 1, and then an excessive slurry was removed under the influence of air stream. Thereafter, the coated Catalyst A was dried and then fired at 400° C. for 1 hour thereby forming a Catalyst C including a coat layer having a weight of 60 g per liter of the support. The Catalyst C has a Rh carrying amount of 6.7 g/cf (0.24 g/liter) and a Pt carrying amount of 6.7 g/cf (0.24 g/liter)

Subsequently, the above Catalyst C was coated with a barium acetate solution and then fired at 400° C. for 1 hour so as to be impregnated with 20 g/liter of BaO. Thus, an exhaust gas purifying catalyst of Example 7 was obtained.

EXAMPLE 8

The procedure made in Example 7 was repeated with the exception that $Mg_{0.09}Zr_{1.0}O_x$ was used in place of $Ca_{0.2}Zr_{1.0}O_x$, thereby obtaining an exhaust gas purifying catalyst of Example 8.

EXAMPLE 9

The procedure made in Example 7 was repeated with the exception that $Sr_{0.1}Zr_{1.0}O_x$ $Mg_{0.09}Zr_{1.0}O_x$ as used in place of $Ca_{0.2}Zr_{1.0}O_x$, thereby obtaining an exhaust gas purifying catalyst of Example 9.

EXAMPLE 10

The procedure made in Example 1 was repeated with the exception that $Y_{0.1}Zr_{1.0}O_x$ was used in place of $Ca_{0.2}Zr_{1.0}O_x$, thereby obtaining an exhaust gas purifying catalyst of Example 10.

EXAMPLE 11

The procedure made in Example 7 was repeated with the exception that $La_{0.3}Zr_{1.0}O_x$ was used in place of $Ca_{0.2}Zr_{1.0}O_x$, thereby obtaining an exhaust gas purifying catalyst of Example 11.

EXAMPLE 12

The procedure made in Example 7 was repeated with the exception that $Nd_{0.4}Zr_{1.0}O_x$ was used in place of $Ca_{0.2}Zr_{1.0}O_x$, thereby obtaining an exhaust gas purifying catalyst of Example 12.

COMPARATIVE EXAMPLE 1

The procedure made in Example 1 was repeated with the exception that activated alumina was used in place of $Ca_{0.2}Zr_{1.0}O_x$, thereby obtaining an exhaust gas purifying catalyst of Comparative Example 1.

COMPARATIVE EXAMPLE 2

The procedure made in Example 1 was repeated with the exception that $ZrO_2$ was used in place of $Ca_{0.2}Zr_{1.0}O_x$, thereby obtaining an exhaust gas purifying catalyst of Comparative Example 2.

COMPARATIVE EXAMPLE 3

The procedure made in Example 1 was repeated with the exception that $Ca_{1.0}Zr_{1.0}O_x$ was used in place of $Ca_{0.2}Zr_{1.0}O_x$, thereby obtaining an exhaust gas purifying catalyst of Comparative Example 3.

COMPARATIVE EXAMPLE 4

The procedure made in Example 7 was repeated with the exception that activated alumina was used in place of $Ca_{0.2}Zr_{1.0}O_x$, thereby obtaining an exhaust gas purifying catalyst of Comparative Example 4.

COMPARATIVE EXAMPLE 5

The procedure made in Example 7 was repeated with the exception that $ZrO_2$ was used in place of $Ca_{0.2}Zr_{1.0}O_x$, thereby obtaining an exhaust gas purifying catalyst of Comparative Example 5.

COMPARATIVE EXAMPLE 6

The procedure made in Example 7 was repeated with the exception that $Ca_{1.0}Zr_{1.0}O_x$ was used in place of $Ca_{0.2}Zr_{1.0}O_x$, thereby obtaining an exhaust gas purifying catalyst of Comparative Example 6.

Regarding the exhaust gas purifying catalysts obtained in the above-mentioned Examples 1 to 12 and Comparative Examples 1 to 6, the content of rhodium, platinum, palladium, alkali metals and alkaline earth metals is shown in Table 1.

TABLE 1

| Catalyst | Zr-system composite oxide $[X]_aZr_{1.0}O_x$ | Pd (g/l) | Pt (g/l) | Rh (g/l) | BaO (g/l) |
| --- | --- | --- | --- | --- | --- |
| Example 1 | $Rh/Ca_{0.2}Zr_{1.0}O_x$ | 2.4 | 0.24 | 0.24 | 20.0 |
| Example 2 | $Rh/Mg_{0.09}Zr_{1.0}O_x$ | 2.4 | 0.24 | 0.24 | 20.0 |
| Example 3 | $Rh/Sr_{0.1}Zr_{1.0}O_x$ | 2.4 | 0.24 | 0.24 | 20.0 |
| Example 4 | $Rh/Y_{0.1}Zr_{1.0}O_x$ | 2.4 | 0.24 | 0.24 | 20.0 |
| Example 5 | $Rh/La_{0.3}Zr_{1.0}O_x$ | 2.4 | 0.24 | 0.24 | 20.0 |
| Example 6 | $Rh/Nd_{0.4}Zr_{1.0}O_x$ | 2.4 | 0.24 | 0.24 | 20.0 |
| Example 7 | $Ca_{0.2}Zr_{1.0}O_x$ | 2.4 | 0.24 | 0.24 | 20.0 |
| Example 8 | $Mg_{0.09}Zr_{1.0}O_x$ | 2.4 | 0.24 | 0.24 | 20.0 |
| Example 9 | $Sr_{0.1}Zr_{1.0}O_x$ | 2.4 | 0.24 | 0.24 | 20.0 |
| Example 10 | $Y_{0.1}Zr_{1.0}O_x$ | 2.4 | 0.24 | 0.24 | 20.0 |
| Example 11 | $La_{0.3}Zr_{1.0}O_x$ | 2.4 | 0.24 | 0.24 | 20.0 |
| Example 12 | $Nd_{0.4}Zr_{1.0}O_x$ | 2.4 | 0.24 | 0.24 | 20.0 |
| Comparative example 1 | $Rh/Al_2O_3$ | 2.4 | 0.24 | 0.24 | 20.0 |
| Comparative example 2 | $Rh/ZrO_2$ | 2.4 | 0.24 | 0.24 | 20.0 |
| Comparative example 3 | $Rh/Ca_{1.0}Zr_{1.0}O_x$ | 2.4 | 0.24 | 0.24 | 20.0 |
| Comparative example 4 | $Al_2O_3$ | 2.4 | 0.24 | 0.24 | 20.0 |
| Comparative example 5 | $ZrO_2$ | 2.4 | 0.24 | 0.24 | 20.0 |
| Comparative example 6 | $Ca_{1.0}Zr_{1.0}O_x$ | 2.4 | 0.24 | 0.24 | 20.0 |

EXPERIMENT

The exhaust gas purifying catalysts of the above-mentioned Examples 1 to 12 and Comparative Examples 1 to 6 were evaluated in performance after being subjected to a durability test.

DURABILITY TEST

The durability test was conducted as follows: Each exhaust gas purifying catalyst of the Examples and Comparative Examples was encased in a housing which was disposed in an exhaust pipe connected to an exhaust manifold of an automotive internal combustion engine. The engine was operated under the following conditions:

Displacement of the engine: 4400 cc

Fuel of the engine: leaded gasoline (Pb: 50 mg/usg)

Gas temperature at the inlet of the catalyst: 950° C.

Test time: 100 hours

Gas composition at the catalyst inlet:

CO: 0.5±0.1%
O₂: 0.5±0.1%
HC: about 1100 ppm
NO: 1300 ppm
CO₂: 15%

EVALUATION OF PERFORMANCE OF CATALYST

[EVALUATION I (for Low Temperature Activity)]

After the above durability test, each catalyst of the Examples and Comparative Examples was set in the similar manner to the durability test, a temperature ($T_{50}/°C$.) of the catalyst at which a conversion (%) of HC, CO and NOx had reached a level of 50% was measured. This temperature is represented as a low temperature activity of each catalyst and shown in Table 2. The measurement of he conversion (%) was accomplished under the following conditions:

Displacement of engine: 2000 cc

Fuel: unleaded gasoline

Temperature increasing rate: 10° C./min.

Temperature range for the measurement: 150°–500° C.

TABLE 2

| Catalyst | $T_{50}/°C$. | | |
|---|---|---|---|
| | HC | CO | NOx |
| Example 1 | 314 | 310 | 315 |
| Example 2 | 308 | 304 | 309 |
| Example 3 | 317 | 313 | 318 |
| Example 4 | 311 | 307 | 312 |
| Example 5 | 315 | 311 | 316 |
| Example 6 | 318 | 314 | 319 |
| Example 7 | 323 | 319 | 324 |
| Example 8 | 319 | 315 | 320 |
| Example 9 | 325 | 321 | 326 |
| Example 10 | 327 | 323 | 328 |
| Example 11 | 321 | 317 | 322 |
| Example 12 | 322 | 318 | 313 |
| Comparative example 1 | 375 | 367 | 372 |
| Comparative example 2 | 326 | 324 | 328 |
| Comparative example 3 | 349 | 343 | 348 |
| Comparative example 4 | 353 | 350 | 356 |
| Comparative example 5 | 337 | 335 | 339 |
| Comparative example 6 | 362 | 356 | 361 |

[EVALUATION II (for Exhaust Gas Purifying Performance)]

After the above durability test, regarding each catalyst of the Examples and Comparative Examples set in the same manner as in the durability test, a conversion (%) of HC, CO and NOx was measured in an atmosphere having a stoichiometric air-fuel ratio under the following conditions:

Displacement of engine: 2000 cc

Fuel: unleaded gasoline

Exhaust gas temperature at the inlet of the catalyst: 500° C.

Stoichiometric atmosphere:

Center: Air-fuel ratio=14.6

Amplitude: ΔA/F=±1.0

The above-mentioned conversion (%) of HC, CO and NOx was calculated by the following equations:

$$\text{NOx conversion (\%)} = \frac{\text{IN (NOx)} - \text{OUT (NOx)}}{\text{IN (NOx)}} \times 100$$

where IN(NOx) is a NOx concentration at the inlet of the catalyst; and OUT(NOx) is a NOx concentration at the outlet of the catalyst.

$$\text{HC conversion (\%)} = \frac{\text{IN (HC)} - \text{OUT (HC)}}{\text{IN (HC)}} \times 100$$

where IN(HC) is a HC concentration at the inlet of the catalyst; and OUT(HC) is a HC concentration at the outlet of the catalyst.

$$\text{CO conversion (\%)} = \frac{\text{IN (CO)} - \text{OUT (CO)}}{\text{IN (CO)}} \times 100$$

where IN(CO) is a CO concentration at the inlet of the catalyst; and OUT(CO) is a CO concentration at the outlet of the catalyst.

A plurality of the convertion (%) was measured for each catalyst of Examples and Comparative Examples and averaged to obtain an average conversion (%) shown in Table 3.

As is apparent from the above-mentioned experimental results, the catalysts of Examples are superior in durability at high temperatures, and in low temperature activity and exhaust gas purifying performance such as the exhaust gas component convention (%) after the durability test, as compared with the catalysts of Comparative Examples which are not within the scope of the present invention.

TABLE 3

| Catalyst | Conversion (%) | | |
|---|---|---|---|
| | HC | CO | NOx |
| Example 1 | 95 | 95 | 97 |
| Example 2 | 96 | 95 | 98 |
| Example 3 | 95 | 94 | 97 |
| Example 4 | 96 | 96 | 98 |
| Example 5 | 95 | 95 | 97 |
| Example 6 | 94 | 95 | 96 |
| Example 7 | 91 | 91 | 93 |
| Example 8 | 91 | 91 | 92 |
| Example 9 | 90 | 90 | 92 |
| Example 10 | 90 | 90 | 91 |
| Example 11 | 89 | 90 | 90 |
| Example 12 | 89 | 89 | 91 |
| Comparative example 1 | 73 | 59 | 62 |
| Comparative example 2 | 88 | 73 | 77 |
| Comparative example 3 | 75 | 61 | 64 |
| Comparative example 4 | 78 | 63 | 67 |
| Comparative example 5 | 86 | 71 | 76 |
| Comparative example 6 | 80 | 65 | 69 |

What is claimed is:

1. A catalyst for purifying exhaust gas, comprising:
a monolithic carrier; and
a catalyst component carrying layer formed on a surface of said monolithic carrier, said carrier component carrying layer including
a catalyst component including rhodium, and
a catalyst component substrate for carrying the catalyst component, said catalyst component substrate including a composite oxide containing zirconium oxide and at least one element selected from the group consisting of magnesium, calcium, strontium, barium, yttrium and lanthanum, said composite oxide having a composition represented by the following general formula:

$X_aZr_bO_c$ where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_aZr_bO_c$.

2. A catalyst as claimed in claim 1, wherein said zirconium oxide contains at least one element selected from the group consisting of cerium, neodymium and lanthanum in an amount ranging from 1 to 40 mol % upon being converted into metal, in which zirconium is in an amount ranging from 60 to 98 mol % upon being converted into metal.

3. A catalyst as claimed in claim 1, wherein said catalyst component carrying layer includes an alumina which contains at least one element selected from the group consisting of platinum and palladium, activated alumina, and at least one element selected from the group consisting of cerium, zirconium and lanthanum, in a total amount ranging from 1 to 10 mol % upon being converted into metal; and a cerium oxide which contains at least one element selected from the group consisting of zirconium, neodymium and lanthanum in an amount ranging from 1 to 40 mol %, in which cerium is contained in an amount ranging from 60 to 98 mol %.

4. A catalyst as claimed in claim 1, wherein said catalyst component carrying layer includes at least one element selected from the group consisting of elements of alkali metals and of alkaline earth metals.

5. A method of producing a catalyst for purifying exhaust gas, comprising the following steps:
adding a water soluble salt of zirconium and a water soluble salt of at least one element selected from the group consisting of magnesium, calcium, strontium, barium, yttrium and lanthanum into water to form a liquid containing at least one catalyst component;
adding an aqueous solution containing at least one of aqueous ammonia and an ammonium compound to the liquid so as to adjust the pH of the liquid within a range of from 6.0 to 10.0 thereby obtaining precipitate;
drying the precipitate;
firing the dried precipitate thereby forming a composite oxide containing zirconium oxide and at least one element selected from the group consisting of magnesium, calcium, strontium, barium, yttrium and lanthanum, said composite oxide having a composition represented by the following general formula:

$X_aZr_bO_c$ where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_aZr_bO_c$;
impregnating the composite oxide with rhodium;
providing a monolithic carrier; and
coating the composite oxide containing rhodium on a surface of the monolithic carrier.

6. A method of producing a catalyst for purifying exhaust gas, comprising the following steps:
preparing a suspension liquid containing zirconium oxide;
adding a water soluble salt of at least one element selected from the group consisting of magnesium, calcium, strontium, barium, yttrium and lanthanum into water to form a liquid containing at least one catalyst component;
gradually dropping the catalyst component containing liquid to the suspension liquid to form a mixed liquid;
adjusting the pH of the mixed liquid at a level ranging from 6.0 to 10.0 to form precipitate; and
drying the precipitate;
firing the dried precipitate thereby forming a composite oxide containing zirconium oxide and at least one element selected from the group consisting of magnesium, calcium, strontium, barium, yttrium and lanthanum, said composite oxide having a composition represented by the following general formula:

$X_aZr_bO_c$ where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_aZr_bO_c$;
impregnating the composite oxide with rhodium;
providing a monolithic carrier; and
coating the composite oxide containing rhodium on a surface of the monolithic carrier.

7. A method of producing a composite oxide forming part of a catalyst for purifying exhaust gas, comprising the following steps:
adding a water soluble salt of zirconium and a water soluble salt of at least one element selected from the group consisting of magnesium, calcium, strontium, barium, yttrium and lanthanum into water to form a liquid containing at least one catalyst component;
adding an aqueous solution containing at least one of ammonia and an ammonium compound to the liquid so as to adjust the pH of the liquid within a range of from 6.0 to 10.0 thereby obtaining precipitate;
drying the precipitate; and
firing the dried precipitate thereby obtaining the composite oxide containing zirconium oxide and at least one element selected from the group consisting of magnesium, calcium, strontium, barium, yttrium and lanthanum, said composite oxide having a composition represented by the following general formula:

$X_aZr_bO_c$ where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_aZr_bO_c$.

8. A method of producing a composite oxide forming part of a catalyst for purifying exhaust gas, comprising the following steps:
preparing a suspension liquid containing zirconium oxide;
adding a water soluble salt of at least one element selected from the group consisting of magnesium, calcium, strontium, barium, yttrium and lanthanum into water to form a liquid containing at least one catalyst component;
gradually dropping the catalyst component containing liquid to the suspension liquid to form a mixed liquid;

adjusting the pH of the mixed liquid at a level ranging from 6.0 to 10.0 to form precipitate;

drying the precipitate; and firing the dried precipitate thereby obtaining the composite oxide containing zirconium oxide and at least one element selected from the group consisting of magnesium, calcium, strontium, barium, yttrium and lanthanum, said composite oxide having a composition represented by the following general formula:

$$X_a Zr_b O_c$$

where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_a Zr_b O_c$.

9. A catalyst for purifying exhaust gas, comprising:

a monolithic carrier; and a catalyst component carrying layer formed on a surface of said monolithic carrier, said catalyst carrier component carrying layer including rhodium and a composite oxide, said composite oxide containing zirconium oxide and at least one element selected from the group consisting of magnesium, calcium, strontium, barium, yttrium and lanthanum;

said composite oxide being produced by a process including the following steps:

adding a water soluble salt of zirconium and a water soluble salt of at least one element selected from the group consisting of magnesium, calcium, strontium, barium, yttrium and lanthanum into water to form a liquid containing at least one catalyst component;

adding an aqueous solution containing at least one of ammonia and an ammonium compound to the liquid so as to adjust the pH of the liquid within a range of from 6.0 to 10.0 thereby obtaining precipitate;

drying the precipitate; and firing the dried precipitate thereby obtaining the composite oxide containing zirconium oxide and at least one element selected from the group consisting of magnesium, calcium, strontium, barium, yttrium and lanthanum, said composite oxide having a composition represented by the following general formula:

$$X_a Zr_b O_c$$

where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_a Zr_b O_c$.

10. A catalyst for purifying exhaust gas, comprising:

a monolithic carrier; and a catalyst component carrying layer formed on a surface of said monolithic carrier, said catalyst carrier component carrying layer including rhodium and a composite oxide, said composite oxide containing zirconium oxide and at least one element selected from the group consisting of magnesium, calcium, strontium, barium, yttrium and lanthanum;

said composite oxide being produced by a process including the following steps:

preparing a suspension liquid containing zirconium oxide;

adding a water soluble salt of at least one element selected from the group consisting of magnesium, calcium, strontium, barium, yttrium and lanthanum into water to form a liquid containing at least one catalyst component;

gradually dropping the catalyst component containing liquid to the suspension liquid to form a mixed liquid;

adjusting the pH of the mixed liquid at a level ranging from 6.0 to 10.0 to form precipitate;

drying the precipitate; and firing the dried precipitate thereby obtaining the composite oxide containing zirconium oxide and at least one element selected from the group consisting of magnesium, calcium, strontium, barium, yttrium and lanthanum, said composite oxide having a composition represented by the following general formula:

$$X_a Zr_b O_c$$

where X is at least one element selected from the group consisting of magnesium, calcium, strontium, barium, yttrium and lanthanum; and a, b, and c, indicate atomic ratios, in which a is within a range of from 0.01 to 0.6 on the basis of b being 1.0 and c is a number which satisfies the valence of elements of the formula $X_a Zr_b O_c$.

* * * * *